T. R. COOK.
POWER MECHANISM.
APPLICATION FILED SEPT. 23, 1909.
970,609.
Patented Sept. 20, 1910.
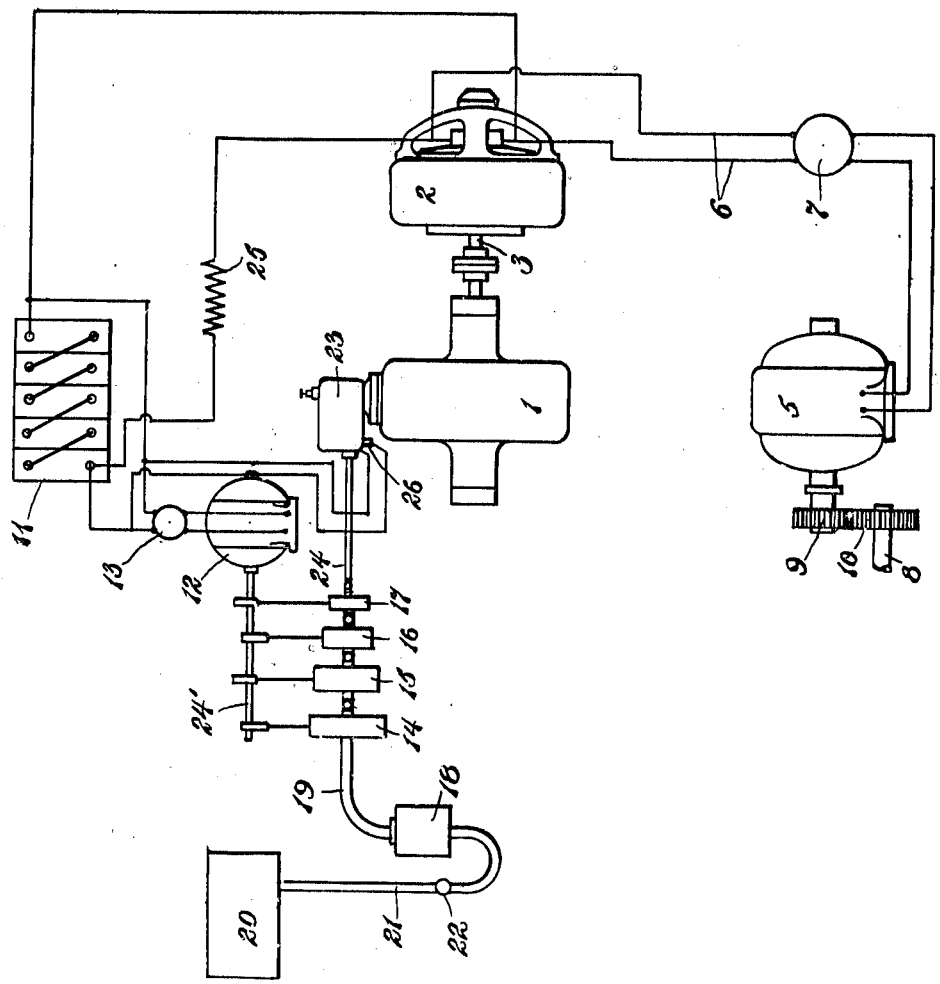
WITNESSES
INVENTOR

UNITED STATES PATENT OFFICE.

THOMAS R. COOK, OF FORT WAYNE, INDIANA.

POWER MECHANISM.

970,609.

Specification of Letters Patent.　Patented Sept. 20, 1910.

Application filed September 23, 1909.　Serial No. 519,226.

*To all whom it may concern:*

Be it known that I, THOMAS R. COOK, a citizen of the United States, residing at Fort Wayne, in the county of Allen and State of Indiana, have invented certain new and useful Improvements in Power Mechanism, of which the following is a specification.

The invention relates to power mechanism for utilizing the drive of a high speed explosive turbine in connection with a dynamo and particularly to the means for regulating the speed of the turbine. The invention has for its object; the provision of a simple and effective means whereby an improved and flexible control is secured. One embodiment of the invention is illustrated in the accompanying drawings, wherein:—

The figure is a diagrammatic plan view showing the arrangement of the apparatus.

The invention is designed primarily for use with motor vehicles, but may be used in other relations. It is particularly adapted for use in motor vehicles for the reason that the high speed turbine and dynamo employed may be made very light in weight. Furthermore, a smooth yielding drive is secured, and the necessity of clutches and reversing mechanism is avoided.

Referring to the drawing, 1 is a high speed explosive turbine which may be of any approved type; 2 is a dynamo which has its axle 3 connected directly to the axle of the turbine; 5 is the motor, which is supplied with current from the dynamo 2 by means of the wiring connections 6; 7 is a controller interposed in the wiring connections 6; 8 is the drive shaft of a vehicle; and 9 and 10 are reducing gears interposed between the axle of the motor 5 and the drive shaft 8.

The mechanism for controlling the speed of the turbine 1 and consequently of the motor 5 will now be described, it being understood that the invention resides particularly in such mechanism. This controlling mechanism includes, in the embodiment of the invention illustrated, a storage battery 11, an auxiliary motor 12 driven from such storage battery, a controller 13 whereby the speed of the motor 12 is governed, and a pumping device operated from the shaft of the motor 12, and adapted to supply compressed gaseous fuel to the combustion chamber 23 of the turbine 1. The compression of the fuel in the pumping device is preferably accomplished in stages in the series of cylinders 14, 15, 16 and 17, the fuel being supplied to the cylinder 14 from the carbureter 18 by means of the pipe 19. The carbureter is supplied from the oil tank 20 by means of the pipe 21, the flow being governed by means of the usual needle valve 22. The usual check valves, as shown, are interposed between the series of pumping cylinders, and the fuel from the last cylinder 17 is conducted to the combustion chamber 23 of the turbine through the pipe 24. The pistons of cylinders 14, 15, 16 and 17 may be operated in any desired way, but as illustrated are operated by means of a series of eccentrics located upon the shafts 24' of the motor 12. The storage battery 11 is supplied with current from the dynamo 2, the resistance 25 being interposed in the circuit to regulate the amount of current supplied. The combustion chamber 23 is shown as supplied with a sparking device 26, but it will be understood that such device may be unnecessary in case the compression in the chamber 23 is sufficient to ignite the fuel. The auxiliary motor 12 is constructed to run at a constant speed for any given amount of current, and this amount of current is controlled by means of the controller 13, so that the amount of fuel which is supplied by the pumping device is directly dependent upon the operation of the controller 13.

It will be seen from the foregoing that the primary control of the apparatus depends upon the operation of the controller 13, as the speed of the turbine and consequently of the driving motor 5 depends directly upon the amount of fuel supplied to the turbine from the pumping device. The controller 7 is useful as a supplemental means for regulating the flow of current to the motor 5. Current is always available for the actuation of the auxiliary motor 12 as it is operated from the storage battery, and the storage battery is constantly supplied by means of its connection with the dynamo 2, so that the controlling mechanism is always in operative condition. The control thus provided is both flexible and reliable, and the weight added by the storage battery and auxiliary motor is unimportant, as these parts may be both made comparatively small and light.

Having thus described my invention and illustrated its use, what I claim as new and desire to secure by Letters Patent is the following:—

1. The combination with a gas turbine, of means independent of the turbine for compressing the gaseous fuel employed and supplying it to the turbine.

2. The combination with a gas turbine, of means independent of the turbine for compressing the gaseous fuel employed and supplying it to the turbine, and means for controlling the speed of operation of said means.

3. The combination with a gas turbine, of means independent of the turbine for compressing the gaseous fuel employed and supplying it to the turbine, a motor for operating said means, and means for controlling the speed of the motor.

4. The combination with a gas turbine, of a pump independent of the turbine for compressing the gaseous fuel employed and supplying it to the turbine, a motor for operating the pump, and manually operated means for regulating the speed of the motor.

In testimony whereof I have hereunto signed my name in the presence of the two subscribed witnesses.

THOMAS R. COOK.

Witnesses:
CHAS. H. PIDGEON,
M. J. BLITZ.